United States Patent [19]

Matsui et al.

[11] 4,257,382
[45] Mar. 24, 1981

[54] ELECTRONIC CONTROL SYSTEM FOR INTERNAL COMBUSTION ENGINES

[75] Inventors: Takeshi Matsui, Aichi; Tokio Kohama, Nishio; Hisasi Kawai, Toyohashi; Akira Nishimatsu; Toshikazu Ina, both of Aichi; Hidetaka Nohira; Kiyoshi Kobashi, both of Mishima, all of Japan

[73] Assignees: Nippon Soken, Inc., Nishio; Toyota Jidosha Kogyo Kabushiki Kaisha, Toyota, both of Japan

[21] Appl. No.: 85,319

[22] Filed: Oct. 16, 1979

[30] Foreign Application Priority Data

Oct. 17, 1978 [JP] Japan .................................. 53/127672

[51] Int. Cl.³ .......................................... F02B 47/08
[52] U.S. Cl. ............................................... 123/571
[58] Field of Search ....................... 125/571, 569, 568

[56] References Cited

U.S. PATENT DOCUMENTS 4,161,929  7/1979  Nohira et al. ........................ 123/571
4,163,435  8/1979  Nakajima et al. .................... 123/571
4,177,777  12/1979 Maruyama et al. ................... 123/571

Primary Examiner—Wendell E. Burns
Attorney, Agent, or Firm—Cushman, Darby & Cushman

[57] ABSTRACT

In an exhaust gas recirculation system adapted to an internal combustion engine, the system comprises a servomotor to be operated by pneumatic pressure and a control valve actuated by the servomotor to control the quantity of exhaust gases recirculated into an intake manifold from an exhaust pipe. The pneumatic pressure applied to the servomotor is electrically controlled without undesired errors to satisfy the following function in relation to the engine intake manifold vacuum and the engine speed:

$$Pe = f(Pv, N)$$

where Pe is the pneumatic pressure applied to the servomotor, Pv and N respectively indicate the engine intake manifold vacuum and the engine speed.

10 Claims, 17 Drawing Figures

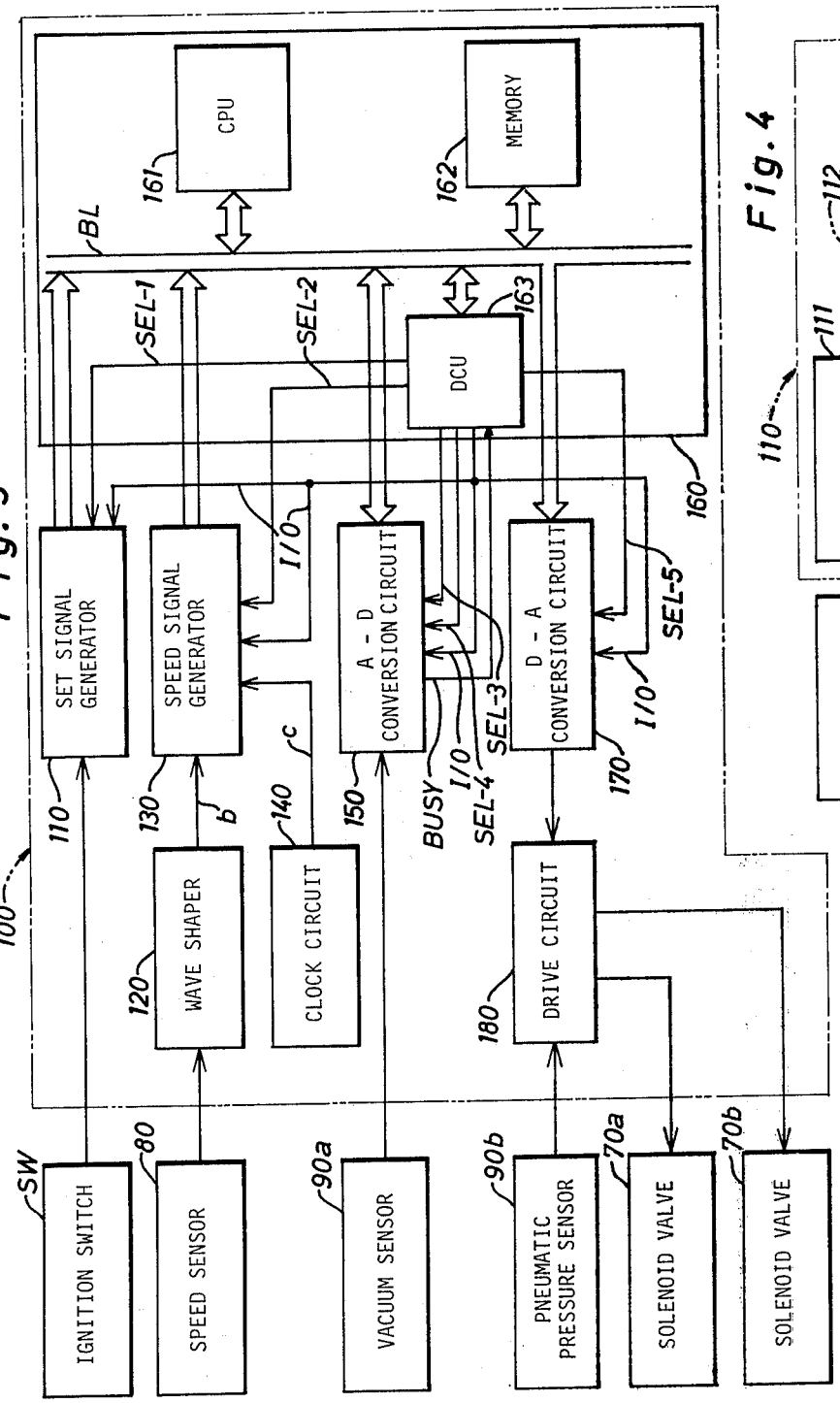
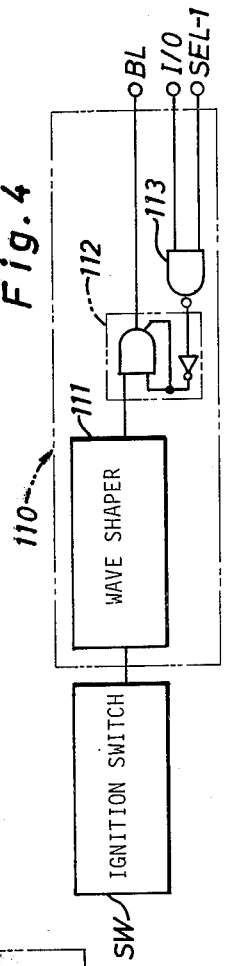

ANALOG VOLTAGE OF D - A CONVERTER

TIME

ELECTRONIC CONTROL SYSTEM FOR INTERNAL COMBUSTION ENGINES

BACKGROUND OF THE INVENTION

The present invention relates to an electronic control system for an internal combsution engine, and more particularly to an improvement of such an electronic control system as disclosed in copending U.S. Pat. application filed on Aug. 8, 1979 for controlling air-to-fuel ratio of the mixture supplied into an intake manifold of the engine in relation of the quantity of exhaust gases recirculated into the intake manifold from an exhaust pipe of the engine.

To ensure optimum operation of an internal combustion engine, the inventors have examined an interrelationship between functions of a carburetor and an exhaust gas recirculation system adapted to the engine. As a result, the inventors have found the fact that it is necessary to decrease air-to-fuel ratio of the mixture in accordance with increase of the quantity of recirculated exhaust gases and to increase air-to-fuel ratio of the mixture in accordance with decrease of the quantity of recirculated exhaust gases.

SUMMARY OF THE INVENTION

To realize the above control, an exhaust gas recirculation system has been proposed by the inventors which comprises a control valve disposed within an exhaust gas recirculation pipe to control the quantity of exhaust gases recirculated into an intake manifold, and a pneumatic servomotor operatively connected with the control valve to control the opening degree of the valve. A carburetor has been also proposed by the inventors which comprises a control valve disposed within an air passage through the carburetor structure to control the flow quantity of air to be mixed with fuel from a float chamber, and a pneumatic servomotor operatively connected with the control valve to control the opening degree of the valve. In an experimentation conducted by the inventors, pneumatic pressure of various values has been applied to the respective servomotors to vary each quantity of the recirculated exhaust gases and the air passing through the air passage to maintain optimum operation of the engine.

As a result of the experimentation, it has been observed that if the pneumatic pressure applied to the servomotors satisfies the following function in relation to the engine intake manifold vacuum and the engine speed, air-to-fuel ratio of the mixture can be properly controlled in relation to changes of the quantity of recirculated exhaust gases under various operating conditions of the engine. In addition, it has been noted that the following function can be commonly adapted to various type of internal combustion engines.

$$Pe = f(Pv, N) \quad (1)$$

where the character Pe indicates the pneumatic pressure applied to the servomoters, and the characters Pv and N respectively indicate the engine intake manifold vacuum and the engine speed.

As shown in FIG. 1, the above function (1) is experimentally represented as a plurality of annular characteristic curves Pe which are indicated in relation to the engine intake manifold vacuum Pv and the engine speed N. In this figure, the characteristic curves Pe indicate higher pneumatic pressure at the inside thereof than that at the outside thereof. In the actual practice of the present invention, the intake manifold vacuum Pv is indicated in a predetermined scale $\Delta Pv$ (For instance, $\Delta Pv = 25$ mmHg) along the ordinate, and the engine speed N is indicated in a predetermined scale $\Delta N$ (For instance, $\Delta N = 200$ r.p.m.) along the abscissa. Thus, a plurality of pneumatic pressure values $f(l\Delta Pv, m\Delta N)$ are obtained in the form of a map or table defined by the above respective scales $l\Delta Pv, m\Delta N$ ($l, m = 1, 2, \ldots$). To calculate the pneumatic pressure values, the following inequalities and equations are used in relation to the respective values Pv, N, $\Delta Pv$, $\Delta N$, the integers l, m, and the above table.

$$l\Delta Pv \leq Pv < (l+1)\Delta Pv \ldots \quad (2)$$

$$m\Delta N \leq N < (m+1)\Delta N \ldots \quad (3)$$

$$Pe' = \frac{\{(l+1)\Delta Pv - Pv\}f(l\Delta Pv, m\Delta N)}{\Delta Pv} \quad (4)$$
$$+ \frac{(Pv - l\Delta Pv)f\{(l+1)\Delta Pv, m\Delta N\}}{\Delta Pv}$$

$$Pe'' = \frac{\{(l+1)\Delta Pv - Pv\}f\{l\Delta Pv, (m+1)\Delta N\}}{\Delta Pv} \quad (5)$$
$$+ \frac{(Pv - l\Delta Pv)f\{(l+1)\Delta Pv, (m+1)\Delta N\}}{\Delta Pv}$$

$$Pe = \frac{\{(m+1)\Delta N - N\}Pe' + (N - m\Delta N)Pe''}{\Delta N} \quad (6)$$

It is, therefore, a primary object of the present invention to provide an electronic control system for an internal combustion engine in which the above-noted function is effectively utilized to control the quantity of recirculated exhaust gases in accordance with the operating conditions of the engine without undesired errors and to control air-to-fuel ratio of the mixture in relation to changes of the quantity of recirculated exhaust gases.

In a preferred embodiment of the present invention, there is provided an electronic control system for an internal combustion engine having a carburetor and an exhaust gas recirculation system, the carburetor including an air induction passage with a venturi portion, a fuel passage supplying fuel from a float chamber into the venturi portion and an air passage permitting the flow of air into the fuel passage to be mixed with fuel, and the exhaust gas recirculation system including a recirculation conduit to provide a communication between an intake manifold and an exhaust pipe of the engine, the control system comprising:

first and second servomotors to be operated by pneumatic pressure applied thereto;

first flow control means associated with the first servomotor for increasing the quantity of exhaust gases flowing through the conduit from the exhaust pipe to the intake manifold in accordance with decrease of the pneumatic pressure and for decreasing the quantity of exhaust gases in accordance with increase of the pneumatic pressure;

second flow control means associated with the second servomotor for increasing the quantity of air flowing through the air passage in accordance with increase of the pneumatic pressure and for decreasing the quantity of air in accordance with decrease of the pneumatic pressure;

first detecting means for producing a first electric binary signal indicative of rotational speed of the engine;

second detecting means for producing a second electric binary signal indicative of intake manifold vacuum of the engine;

third detecting means for detecting pneumatic pressure applied to the first and second servomotors to produce a first electric analog signal indicative of the pneumatic pressure;

a digital computer for calculating a value indicative of optimum pneumatic pressure to be applied to the first and second servomotors in accordance with the first and second binary signals, the computer being programmed to calculate the optimum value from a function describing a desired relationship among optimum pneumatic pressure, rotational speed and intake manifold vacuum of the engine;

means for producing second and third electric analog signals having different levels respectively proportional to the calculated optimum value from the computer, the difference between the respective levels of the second and third analog signals being defined in accordance with changes of the calculated optimum value;

a drive circuit for comparing a level of the first analog signal with each level of the second and third analog signals to produce a first output signal therefrom when the level of the second analog signal is higher than the level of the first analog signal and to produce a second output signal therefrom when the level of the third analog signal is lower than the level of the first analog signal, the drive circuit ceasing the output signals when the level of the first analog signal is in a range between the levels of the second and third analog signals; and first and second electrically operated valves to selectively apply intake manifold vacuum and the atmospheric pressure to the first and second servomotors when energized in response to one of the first and second output signals from the drive circuit.

In actual practice, it is preferable that the second and third analog signals having high and low levels respectively proportional to the calculated optimum value from the computer, the difference between the high and low levels of the second and third analog signals being defined to increase in accordance with increase of the calculated optimum value.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a schematic block diagram of the electronic control system shown in FIG. 2;

FIG. 4 is a circuit diagram of the set signal generator shown in block form in FIG. 3;

DESCRIPTION OF THE PREFERRED EMBODIMENTS

Figure 1:
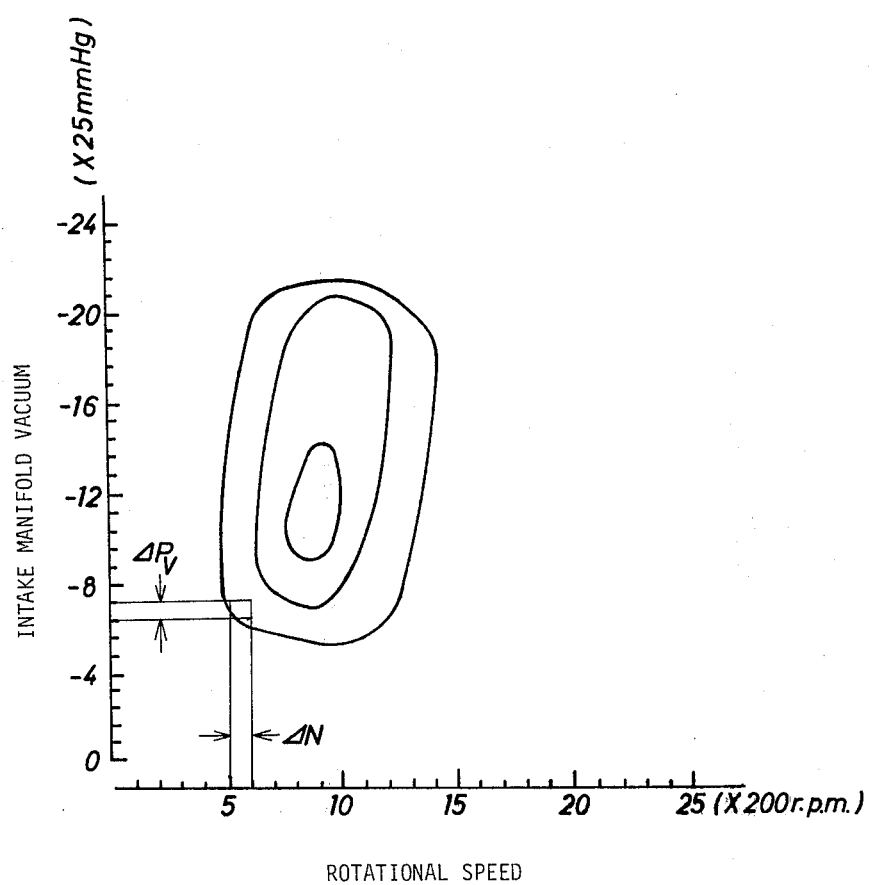
FIG. 1 is a graph illustrating optimum pneumatic pressure in relation to rotational speed and intake manifold vacuum of an internal combustion engine.
Figure 2:
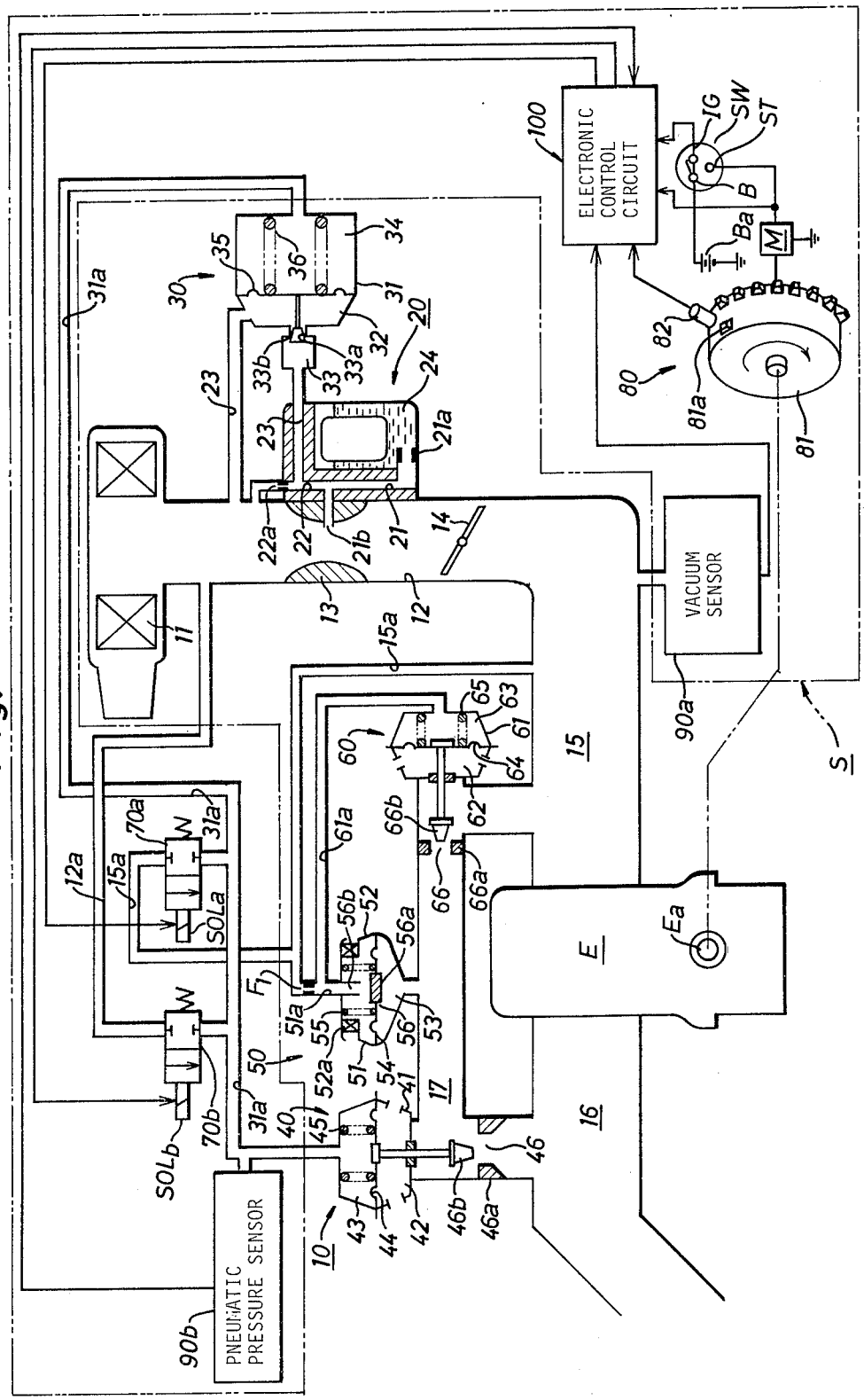
FIG. 2 illustrates an electronic control system in accordance with the present invention which is adapted to a carburetor and an exhaust gas recirculation system for the engine.

Referring now to the drawings, particularly in FIG. 2 there is illustrated an internal combustion engine E for an automotive vehicle which is provided with a carburetor 20 and an exhaust gas recirculation system 10. The exhaust gas recirculation system 10, simply called as EGR system hereinafter, includes an exhaust gas recirculation conduit 17 leading an exhaust pipe 16 of the engine E into an intake manifold 15. The recirculation conduit 17 is provided thereon with gas flow controllers 40, 60 and a pressure regulator 50. The caburetor 20 includes an air induction passage 12 through which the air from an air cleaner 11 flows into the intake manifold 15. The induction passage 12 is provided therein with a venturi portion 13 into which a fuel injection nozzle 21b opens and with a throttle valve 14 located at the downstream of venturi portion 13. The fuel injection nozzle 21b communicates inot a float chamber 24 through a fuel passage 21 and a fuel jet 21a. The carburetor 20 further includes a primary air passage 22 in communication with the fuel passage 21 and a secondary air passage 23 in communication with the primary air passage 22. The primary air passage 22 communicates through an air jet 22a to the induction passage 12 at the upstream of venturi portion 13, and the secondary air passage 23 communicates through an air flow controller 30 to the induction passage 12 at the upstream of venturi portion 13.

The air flow controller 30 has a servomotor which includes a diaphragm member 35 assembled within a housing 31 to form an atmospheric chamber 32 and a servo-chamber 34. The atmospheric chamber 32 communicates into the upstream of air passage 23 and into the downstream of air passage 23 through a valve seat 33a, while the servo-chamber 34 is connected through a conduit 31a to a pair of normally closed solenoid valves 70a and 70b. The diaphragm member 35 includes a valve member 33b centrally fixed thereto and is biased by a compression spring 36 toward the atmospheric chamber 32. Thus, the valve member 33b cooperates with the valve seat 33a to provide a control valve 33. The control valve 33 is fully opened due to the biasing force of spring 36 when the pneumatic pressure in servo-chamber 34 is substantially the atmospheric pressure. When the pneumatic pressure in servo-chamber 34 decreases by an intake vacuum applied thereto, the diaphragm member 35 moves against the biasing force of spring 36 to close the control valve 33. The opening degree of control valve 33 is controlled by the biasing force of spring 36 and a pressure differential between the atmospheric pressure in the chamber 32 and a pneumatic pressure applied into the servo-chamber 34 through the passage 31a.

The gas flow controller 40 has a servomotor which includes a diaphragm member 44 assembled within a housing 41 to form an atmospheric chamber 42 and a servo-chamber 43. The diaphragm member 44 includes a rod centrally fixed thereto and is biased by a compression spring 45 toward the atmospheric chamber 42. The atmospheric chamber 42 is vented, while the servo-chamber 43 is connected to the solenoid valves 70a and 70b through an extended portion of passage 31a. The gas flow controller 40 is provided with a gas flow control valve 46 which is located at the upstream of exhaust gas recirculation conduit 17. The control valve 46 comprises a valve seat 46a secured to the inner wall of conduit 17 and a valve member 46b fixed to the rod of diaphragm member 44 to cooperate with the valve seat 46a. The opening degree of control valve 46 is controlled by the biasing force of spring 45 and a pressure differential between the atmospheric pressure in the chamber 42 and a pneumatic pressure applied to the servo-chamber 43. In this embodiment, assuming that the atmospheric pressure is 0 mmHg, the control valve 46 is fully closed at a pressure of −40 mmHg in the servo-chamber 43 and is fully opened at a pressure of −160 mmHg in the servo-chamber 43.

The pressure regulator 50 has a diaphragm member 54 assembled within a housing 51 to form an atmospheric chamber 52 and an exhaust gas chamber 53. The diaphragm member 54 includes a valve member 56a centrally fixed thereto and is biased by a compression spring 55 toward the exhaust gas chamber 53. The exhaust gas chamber 53 is in open communication with the conduit 17, while the atmospheric chamber 52 is vented through an air cleaner 52a and connected through a passage 51a to a passage 15a. The passage 51a is provided therein with an orifice $F_1$ and at its open end with a valve seat 56b which cooperates with the valve member 56a to provide a pressure regulator valve 56. The opening degree of regulator valve 56 is controlled by the biasing force of spring 55 and a pressure differential between the atmospheric pressure in the chamber 52 and an exhaust pressure applied to the chamber 53.

The gas flow controller 60 has a diaphragm member 64 assembled within a housing 61 to form an atmospheric chamber 62 and a variable pressure chamber 63. The diaphragm member 64 includes a piston rod centrally fixed thereto and is biased by a compression spring 65 toward the atmospheric chamber 62. The atmospheric chamber 62 is vented, while the variable pressure chamber 63 is connected to the intake manifold 15 through a passage 61a, the orifice $F_1$ and a portion of passage 15a. The gas flow controller 60 is provided with a gas flow control valve 66 which is located at the downstream of exhaust gas recirculation conduit 17. The control valve 66 comprises a valve seat 66a secured to the inner wall of conduit 17 and a valve member 66b fixed to the piston rod of diaphragm member 64. The opening degree of control valve 66 is controlled by the biasing force of spring 65 and a pressure differential between the atmospheric pressure in the chamber 62 and a pneumatic pressure applied to the chamber 63.

In FIG. 2, the character S designates a control system which comprises an electronic control circuit 100 to selectively energize the solenoid valves 70a and 70b in response to input signals from an ignition switch SW, a rotational speed sensor 80, a vacuum sensor 90a and a pneumatic pressure sensor 90b. The solenoid valve 70a has an inlet port in communication with the servo-chamber 34 of air flow controller 30 and the servo-chamber 43 of gas flow controller 40 by way of the passage 31a and an outlet port in communication with the intake manifold 15 by way of the passage 15a. When the solenoid valve 70a is energized by receiving at its solenoid SOLa a first output signal from the control circuit 100, the passage 31a is connected to the passage 15a. The solenoid valve 70b has an inlet port in communication with the upstream of venturi portion 13 through a passage 12a and an outlet port in communication with the servo-chamber 34 of air flow controller 30 and the servo-chamber 43 of gas flow controller 40 by way of the passage 31a. When the solenoid valve 70b is energized by receiving at its solenoid SOLb a second output signal from the control circuit 100, the passage 12a is connected to the passage 31a.

Figure 10:
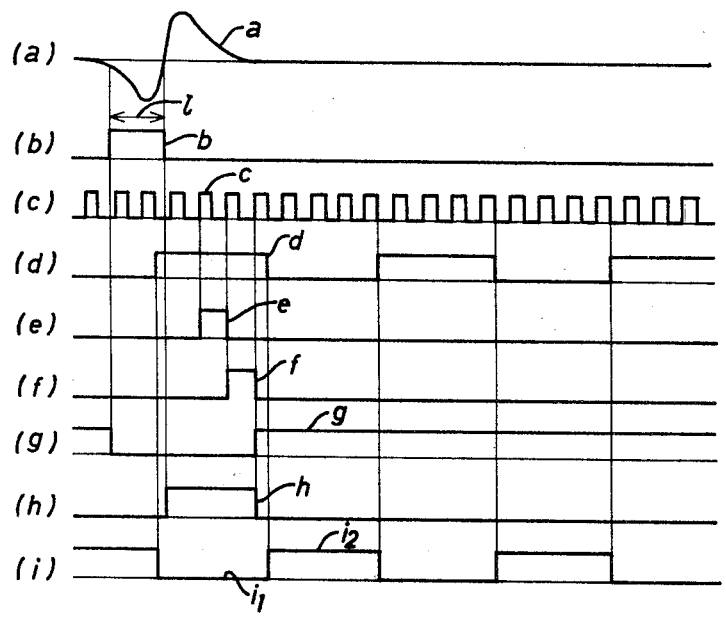
FIG. 10 illustrates waveforms obtained at various points in the circuit diagram of FIG. 5.

When the ignition switch SW is operated to provide an electric connection between contacts B and IG, the electronic control circuit 100 is activated by a DC voltage from a source of electricity in the form of a conventional automotive type storage battery Ba. When the ignition switch SW is subsequently operated to provide an electric connection between contacts B and ST, a starter motor M of the engine E is temporarily driven. The rotational speed sensor 80 is a magnetic pickup type detector which includes a magnetic puckup transducer 82 in magnetic coupling relationship with a projection 81a on a ring gear 81. The ring gear 81 is driven by a crankshaft Ea of the engine E and rotates once at one crankshaft rotation. During rotation of the crankshaft Ea, the transducer 82 detects the angular position of projection 81a at each rotation of ring gear 81 to produce an electric signal indicative of rotational speed of the engine E, as shown in FIG. 10.

The vacuum sensor 90a is provided on the intake manifold 15 to detect engine intake manifold vacuum, producing an electric signal indicative of the intake manifold vacuum, and the pneumatic pressure sensor 90b is provided on a conduit of passage 31a between the flow controllers 30, 40 and the solenoid valves 70a, 70b to detect a pneumatic pressure in the passage 31a, producing an electric signal voltage Va indicative of the pneumatic pressure. In the embodiment, the signal voltage Va becomes higher as the pneumatic pressure approaches the atmospheric pressure.

As shown in FIG. 3, the electronic control circuit 100 comprises a set signal generator 110 which produces a set signal in response to a direct current across the ignition switch SW. The set signal is applied to a bus line BL of a digital computer 160 in response to an input-output or I/O signal and a first device-select or SEL-1 signal from the computer 160, as described later in detail. In the electronic control circuit 100, a wave shaper 120 is provided to reshape the electric signal a from speed sensor 80 into a square wave form pulse signal b, as shown in FIG. 10. The pulse signal b has a pulse-width $\tau$ and a period of time T corresponding with rotational speed of the engine E. A clock circuit 140 is a conventional crystal oscillator which serves to generate a series of clock pulses c at a predetermined frequency, as shown in FIG. 10. A speed signal generator 130 is coupled with the wave shaper 120 and the clock circuit 140 to calculate the period of time T of the pulse signal b in accordance with the clock pulses c. Then, the calculated resultant value is latched in the speed signal generator 130 nd applied as a binary signal to the bus line Bl of digital computer 160 in response to the I/O signal and a second device-select or SEL-2 signal from computer 160. An analog-to-digital conversion circuit 150 is operated by an output request signal from computer 160 to convert an input signal from vacuum sensor 90a into a binary signal in response to the I/O signal, third and fourth device-select or SEL-3 and SEL-4 signals from computer 160. The binary signal from circuit 150 is applied to the computer 160 through bus line BL.

The digital computer 160 is a commercially available computer of TLCS-12A type manufactured by Tokyo Shibaura Electric Co., Ltd. in Japan. The digital computer 160 comprises a central processing unit or CPU 161, a memory 162, having a read-only memory and a random access memory, in connection with CPU 161 through bus line BL, and a device control unit or DCU 163. A predetermined program is previously stored in memory 162 such that CPU 161 calculates the above-noted inequalities (2), (3) and equations (4) to (6) by using the binary signals from speed signal generator 130 and analog-to-digital conversion circuit 150. It is also noted that the memory 162 stores therein the above-noted data indicative of a plurality of pneumatic pressure values f(lΔPv, mΔN) in the form of the map. DCU 163 acts to produce therefrom the I/O signal, the SEL-1 to SEL-4 signals and a fifth device-select or SEL-5 signal by receiving a request signal from CPU 161. In accordance with proceeding of the program, the SEL-1 and I/O signals are applied to set signal generator 110, the SEL-2 and I/O signals are applied to speed signal generator 130, the SEL-3, 4 and I/O signals are applied to analog-to-digital conversion circuit 150, and the SEL-5 and I/O signals are applied to a digital-to-analog conversion circuit 170. Further detailed description regarding the digital computer is abbreviated because the particular construction and programming process is well known in the prior arts. The digital-to-analog conversion circuit 170 serves to convert an electric binary signal indicative of the calculated optimum value from computer 160 into an electric analog voltage in response to the I/O and SEL-5 signals. The converted analog voltage is applied from the conversion circuit 170 to a drive circuit 180.

The drive circuit 180 serves to form therein a first electric voltage proportional to the converted analog voltage from conversion circuit 170. The drive circuit 180 also serves to form therein a second electric voltage proportional to the converted analog voltage, a difference between the first and second electric voltages changing in relation to change of the converted analog voltage. When the signal voltage Va from pneumatic pressure sensor 90b is in a value between the first and second electric voltages, the drive circuit 180 produces electric signals for respectively deenergizing the solenoids SOLa, SOLb of solenoid valves 70a, 70b. When the signal voltage Va is not in a value between the first and second electric voltages, the drive circuit 180 selectively produces the above-noted first and second output signals for respectively energizing the solenoids SOLa, SOLb.

In FIG. 4, there is illustrated a preferred embodiment of the set signal generator 110 in which a three-state-buffer 112 is provided to transfer an output square wave form pulse from wave shaper 111 to the bus-line BL of computer 160 in response to an output signal from a NAND-gate 113. The wave shaper 111 is provided to reshape DC voltage from ignition switch SW into a set signal in the form of an output square wave form pulse. NAND-gate 113 acts to produce a low level signal therefrom in response to the I/O and SEL-1 signals of high level from DCU 163. When one of the I/O and SEL-1 signals becomes a low level signal, NAND-gate 113 produces a high level signal at its output terminal. The three-state-buffer 112 applies the output square wave form pulse from wave shaper 111 to the bus-line BL of computer 160 in response to the low level signal from NAND-gate 113. When received the high level signal from NAND-gate 113, the buffer 112 interrupts the output pulse from wave shaper 111 due to high impedance at its output terminal.

Figure 5:
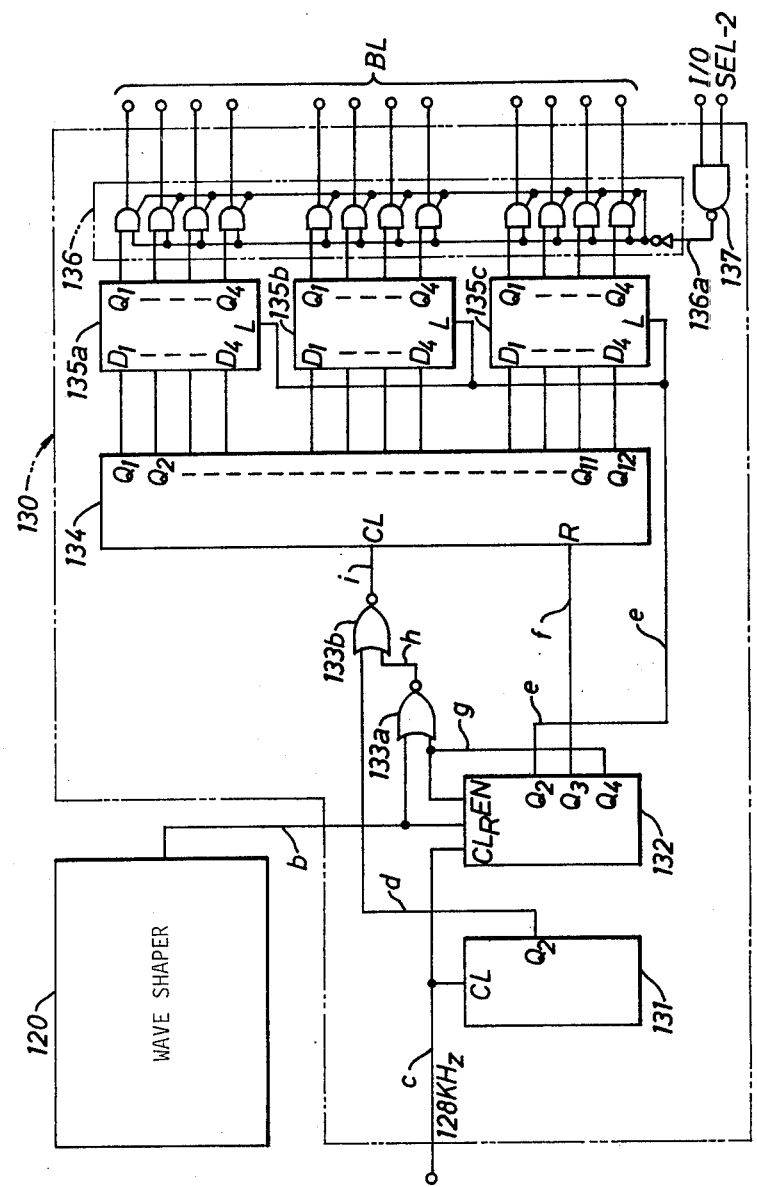
FIG. 5 is a circuit diagram of the speed signal generator shown in block form in FIG. 3.

FIG. 5 illustrates a preferred embodiment of the speed signal generator 130 which comprises a binary counter 131 having a clock terminal CL for receiving clock pulses c at a frequency of about 128 KHz from clock circuit 140. The binary counter 131 is of CD 4024 type manufactured by RCA Corporation in U.S.A. and serves to produce an electric signal d at its output terminal $Q_2$ in accordance with the clock pulses c, as shown in FIG. 10. The electric signal d is applied to a NOR-gate 133b. The speed signal generator 130 also comprises a decade counter 132 which has a reset terminal R for receiving the pulse signal b from wave shaper 120 and a clock terminal CL for receiving the clock pulses c from clock circuit 140. The decade counter 132 is reset in response to the pulse signal b and starts to count the clock pulses c at a trailing edge of the pulse signal b. Then, the counter 132 produces high level signals e, f and g in sequence at its output terminals $Q_2$, $Q_3$ and $Q_4$, as shown in FIG. 10. The high level signal e is applied to shift registers 135a, 135b and 135c, and the high level signal f is applied to a binary counter 134. The high level signal g is further applied to a NAND-gate 133a and to an inhibit terminal EN of counter 132 to inhibit the counting operation.

The NOR-gate 133a has input terminals for respectively receiving the high level signal g from counter 132 and the pulse signal b from wave shaper 120. When the signals g and b are in a low level respectively, NOR-gate 133a produces a high level signal h therefrom, as shown in FIG. 10. The NOR-gate 133b has input terminals for respectively receiving the electric signal d from binary counter 131 and the high level signal h from NOR-gate 133a. When received a high level signal from eithre one of binary counter 131 and NOR-gate 133a, the NOR-gate 133b produces a low level signal $i_1$ therefrom. When received low level signals d and h from binary counter 131 and NOR-gate 133a, the NOR-gate 133b produces a high level signal $i_2$ therefrom. The low and high level signals $i_1$, $i_2$ are alternatively applied to a clock terminal CL of binary counter 134.

The binary counter 134 is reset in response to a high level signal f from decade counter 132 and starts to count a series of high level signals $i_2$ from NOR-gate 133b at a trailing edge of the high level signal f. The counting operation is completed at a trailing edge of an electric pulse signal b which will be produced from wave shaper 120 after generation of the high level signal f. In other words, the counting operation of binary counter 134 starts at the trailing edge of the high level signal f and is completed at the leading edge of a high level signal h which will be produced from NOR-gate 133a after generation of the high level signal f. As a result, the binary counter 134 produces output signals respectively at its terminals $Q_1$ to $Q_{12}$ as an electric binary signal indicative of the period of time T of the pulse signal b, the period of time being proportional to a reciprocal of rotational speed N of the engine E.

The shift registers 135a, 135b and 135c are respectively of CD 4035 type manufactured by RCA Corporation. The shift register 135a has a latch terminal L for receiving the electric signal e from decade counter 132 and input terminals $D_1$ to $D_4$ for respectively receiving the output signals from the terminals $Q_1$ to $Q_4$ of binary counter 134. When the electric signal e appears at the output terminal $Q_2$ of decade counter 132, the register 135a latches therein the output signals from binary counter 134 which are previously counted prior to generation of the electric signal e. The remaining shift registers 135b and 135c have substantially the same construction and function as those of shift register 135a. Thus, all the output signals from binary counter 134 are simultaneously latched as the binary signal by the shift registers 135a, 135b and 135c.

The speed signal generator 130 further comprises a three-state-buffer 136 which has a control terminal 136a for receiving an electric signal from NAND-gate 137 and input terminals for receiving the binary signal from shift registers 135a, 135b and 135c. The NAND-gate 137 has input terminals for receiving the I/O and SEL-2 signals from computer 160 respectively. When both the I/O and SEL-2 signals are in a high level, NAND-gate 137 produces a low level signal therefrom. When one of the I/O and SEL-2 signals becomes a low level signal, NAND-gate 137 produces a high level signal therefrom. Upon receiving the low level signal from NAND-gate 137, the three-state-buffer 136 acts to transfer the binary signal from shift registers to the bus-line BL of computer 160. When received the high level signal from NAND-gate 137, the buffer 136 acts to interrupt the computer 160 from shift registers due to high impedance at its output terminals.

Figure 6:
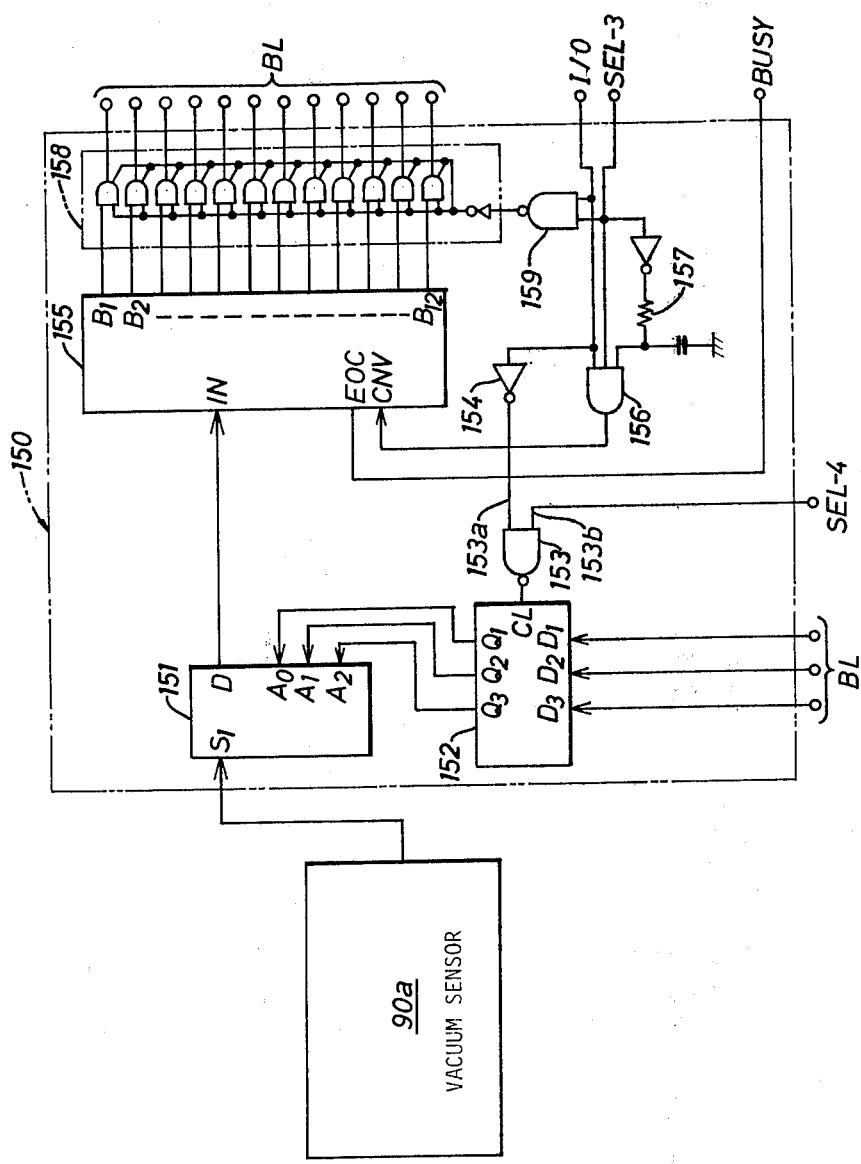
FIG. 6 is a circuit diagram of the analog-to-digital conversion circuit shown in block form in FIG. 3.

FIG. 6 illustrates a preferred embodiment of the analog-to-digital conversion circuit 150 which includes an analog multiplexer 151 controlled by a shift register 152 in response to an output signal from a NAND-gate 153. NAND-gate 153 has a first input terminal 153a for receiving the I/O signal from computer 160 through an inverter 154 and a second input terminal 153b for receiving the SEL-4 signal from computer 160. When an electric binary signal from analog-to-digital conversion circuit 150 is requested by CPU 161 of computer 160 under the program of memory 162, the I/O signal becomes a low level signal, and the SEL-4 signal becomes a high level signal. The low level I/O signal is inverted by inverter 154 so that the NAND-gate 153 produces a low level signal at its output terminal. When CPU 161 of computer 160 does not request the binary signal from analog-to-digital conversion circuit 150, the I/O signal becomes a high level signal, and then the NAND-gate 153 produces a high level signal at its output terminal.

When received the low level signal from NAND-gate 153, the shift register 152 is reset to latch a binary demand signal from computer 160. The latched demand signal acts to connect an input terminal $S_1$ of multiplexer 151 to an output terminal D. When the multiplexer 151 receives the latched demand signal at its control terminals $A_0$, $A_1$, $A_2$, the input terminal $S_1$ is connected to the output terminal D so that the output signal from sensor 90a appears at the output terminal D. In addition, the multiplexer 151 is of DG 508 type manufactured by Intersil Inc. in U.S.A.

Figure 11:
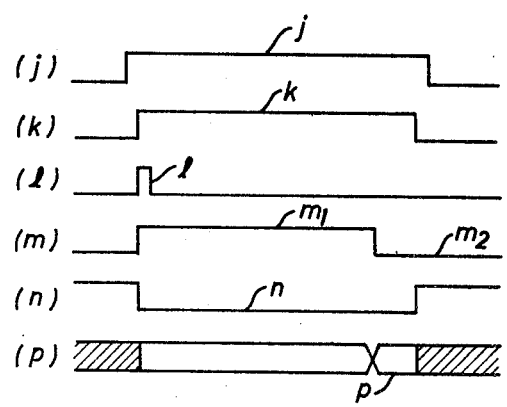
FIG. 11 illustrates waveforms obtained at various points in the circuit diagram of FIG. 6.

The analog-to-digital conversion circuit 150 further includes a successive approximation analog-to-digital converter 155 controlled by an AND-gate 156 and a three-state-buffer 158 controlled by a NAND-gate 159. AND-gate 156 has first and second input terminals for respectively receiving the I/O and SEL-3 signals from computer 160. AND-gate 156 is also provided with a third input terminal for receiving the SEL-3 signal through a delay circuit 157 including a condenser, a resistor and an inverter. When the I/O and SEL-3 signals are respectively high level signals j, k, as shown in FIG. 11, AND-gate 156 produces therefrom an electric pulse signal l having a pulse-width of about 100 nanoseconds. NAND-gate 159 has input terminals for receiving the I/O and SEL-3 signals from computer 160. When the I/O and SEL-3 signals are respectively high level signals j, k, NAND-gate 159 produces a low level signal therefrom. When one of the I/O and SEL-3 signals becomes a low level signal, NAND-gate 159 produces a high level signal therefrom.

The analog-to-digital converter 155 is a converter of ADC 80 type manufactured by Burr-Brown Research Corporation which includes an input terminal IN for receiving the electric signal from multiplexer 151, a convert-command input terminal CNV for receiving the pulse signal from AND-gate 156 and an end-of-conversion output terminal EOC for applying an electric signal to computer 160. When AND-gate 156 produces the pulse signal l therefrom, the converter 155 initiates at the leading edge of pulse signal l to convert the electric signal from multiplexer 151 into a binary signal. Simultaneously, a high level signal $m_1$ appears at the output terminal EOC and is applied as a BUSY signal to DCU 163 of computer 160. Thus, the computer 160 is ready to read out the binary signal supplied from the converter 155 through the three-state-buffer 158. During the operation of converter 155, NAND-gate 159 produces a low level signal n therefrom due to the I/O and SEL-3 signals of high level. When BUSY signal becomes a low level signal $m_2$, the operation of converter 155 ceases, and subsequently the three-state-buffer 158 supplies the binary signal from converter 155 to computer 160 in response to the low level signal n from NAND-gate 159 within a period of time indicated by the character p in FIG. 11. When both the I/O and SEL-3 signals become low level signals respectively, high impedance appears at the output terminal of three-state-buffer 158 to electrically disconnect the computer 160 from the converter 155.

Figure 7:
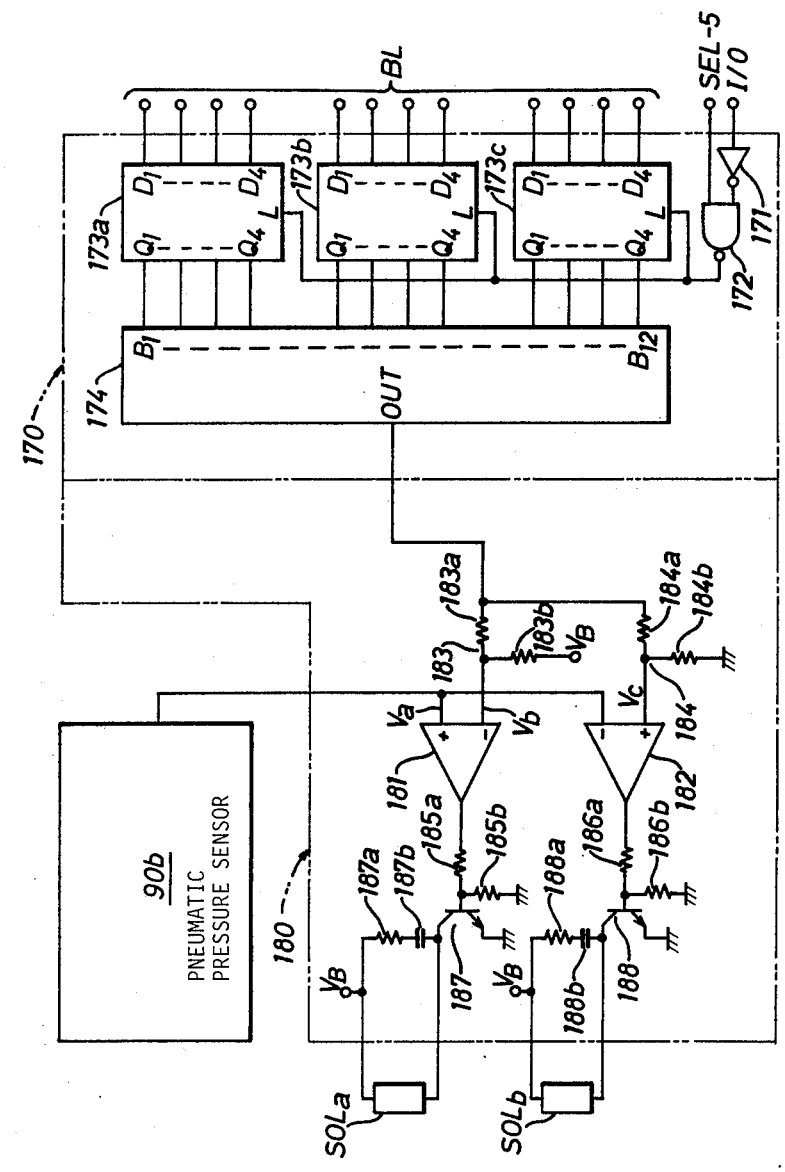
FIG. 7 illustrates circuit diagrams of the digital-to-analog conversion circuit and the drive circuit respectively shown in block forms of FIG. 3.

In FIG. 7 there are illustrated preferred embodiments of the digital-to-analog conversion circuit 170 and the drive circuit 180. The conversion circuit 170 includes shift registers 173a, 173b and 173c which are controlled by a NAND-gate 172. NAND-gate 172 has a first input terminal for receiving the SEL-5 signal from computer 160 and a second input terminal for receiving an inverted signal from an inverter 171. The inverter 171 acts to invert the I/O signal from computer 160 into the inverted signal. When NAND-gate 172 receives the SEL-5 signal of high level and the I/O signal of low level at its input terminals in response to a request signal from computer 160, a low level signal appears at the output terminal of NAND-gate 172 and is applied to the respective shift registers 173a, 173b and 173c. When the computer 160 does not issue any request signal therefrom, a high level signal appears at the output terminal of NAND-gate 172.

Each of the shift registers 173a, 173b and 173c acts to latch the binary signal from computer 160 in response to the low level signal from NAND-gate 172. The latched binary signal is received by a digital-to-analog converter 174, which is a commercially available converter of DAC 80 type manufactured by Burr-Brown Research Corporation. The converter 174 acts to convert the latched binary signal from shift registers 173a, 173b, 173c into an electric analog voltage. In this case, increase of the analog voltage means that pneumatic pressure appearing in the servochambers of controller 30, 40 will approach the atmospheric pressure.

Figure 8:
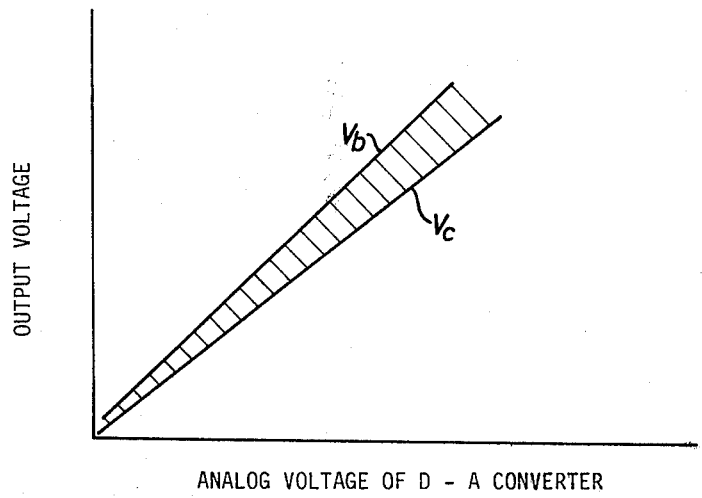
FIGS. 8, 9 are graphs respectively showing operative characteristics of the drive circuit.

The drive circuit 180 comprises a pair of voltage dividers 183, 184 connected to the digital-to-analog converter 174. The voltage divider 183 includes a resistor 183a which has one end for receiving the analog voltage from converter 174 and the other end for receiving a DC voltage $V_B$ from electric power source Ba through a resistor 183b. The voltage divider 183 serves to divide a difference between the DC voltage $V_B$ and the analog voltage from converter 174 into a divided voltage Vb. In the embodiment, the DC voltage $V_B$ is experimentally determined as a value which is slightly higher than an electric voltage corresponding with an absolute pressure of 10 mmHg. The absolute pressure of 10 mmHg is substantially equal to the maximum absolute value of intake mainfold vacuum (or the atmospheric pressure) which is superfluously applied to the flow controllers 30, 40 due to delay of closing operation of solenoid valve 70a (or 70b). Furthermore, the resistors 183a, 183b respectively have resistance values $r_a$, $r_b$ to provide a predetermined ratio $r_a/r_b$. Therefore, the divided voltage Vb from voltage divider 183 changes linearly in relation to change of the analog voltage from converter 174, as shown in FIG. 8.

The voltage divider 184 includes a resistor 184a which has one end for receiving the analog voltage from converter 174 and the other end grounded through a resistor 184b. The voltage divider 184 serves to divide the analog voltage from converter 174 into a divided voltage Vc, the divided voltage Vc being lower than the divided voltage Vb, as clearly understood from the above description. In the embodiment, the resistors 184a, 184b respectively have resistance values $R_a$, $R_b$ to provide a predetermined ratio $R_a/R_b$. Therefore, the divided voltage Vc from voltage divider 184 changes linearly in relation to change of the analog voltage from converter 174, as shown in FIG. 8. Furthermore, the predetermined ratio $R_a/R_b$ is determined larger than the predetermined value $r_a/r_b$ such that a rate of change of the divided voltage Vc against the analog voltage from converter 174 is smaller than that of the divided voltage Vb against the analog voltage from converter 174.

In the drive circuit 180, a comparator 181 is provided with a first input terminal for receiving the signal voltage Va from pneumatic pressure sensor 90b and with a second input terminal for receiving the divided voltage Vb from voltage divider 183. When the signal voltage Va is higher than the divided voltage Vb, the comparator 181 produces a high level signal therefrom. When the signal voltage Va is lower than the divided voltage Vb, the comparator 181 produces a low level signal therefrom. The high and low level signals from comparator 181 are selectively applied to a power transistor 187 through input and bias resistors 185a and 185b. A comparator 182 is provided with a first input terminal for receiving the signal voltage Va from pneumatic pressure sensor 90b and with a second input terminal for receiving the divided voltage Vc from voltage divider 184. When the signal voltage Va is higher than the divided voltage Vc, the comparator 182 produces a low level signal therefrom. When the signal voltage Va is lower than the divided voltage Vc, the comparator 182 produces a high level signal therefrom. The low and high level signals from comparator 182 are selectively applied to a power transistor 188 through input and bias resistors 186a and 186b.

The power transistor 187 is connected at its base to the comparator 181 through the resistors 185a and 185b. The collector of transistor 187 is connected to the electric power source Ba through the solenoid SOLa of valve 70a to receive the DC voltage $V_B$ from power source Ba, the solenoid SOLa being connected in parallel with a resistor 187a and a condenser 187b. Upon receiving the low level signal from comparator 181, the power transistor 187 is turned off to produce therefrom a high level signal for deenergizing the solenoid SOLa. The transistor 187 is turned on in response to the high level signal from comparator 181 to produce therefrom a low level signal or the above-noted first output signal for energizing the solenoid SOLa. The power transistor 188 is connected at its base to the comparator 182 through the resistors 186a and 186b. The collector of transistor 188 is connected to the power source Ba through the solenoid SOLb of valve 70b to receive the DC voltage $V_B$ from power source Ba, the solenoid SOLb being connected in parallel with a resistor 188a and a condenser 188b. Upon receiving the low level signal from comparator 182, the power transistor 188 is turned off to produce therefrom a high level signal for deenegizing the solenoid SOLb. The transistor 188 is turned on in response to the high level signal from comparator 182 to produce therefrom a low level signal or the above-noted second output signal for energizing the solenoid SOLb.

As understood from the above description, when the signal voltage Va is lower than the divided voltage Vb and higher than the divided voltage Vc, the power transistors 187, 188 produce the high level signals respectively in response to the low level signals from comparators 181, 182 such that the solenoids SOLa, SOLb are deenergized respectively to close the solenoid valves 70a, 70b. In other words, this means that a range between the divided voltages Vb, Vc shown in FIG. 8 indicates a non-sensitive area for the solenoid valves 70a, 70b. Furthermore, it will be recognized that a potential difference defined by the non-sensitive area decreases in accordance with decrease of the analog voltage from converter 174 (See FIG. 8). However, because delaying rate of closing operation of solenoid valve 70a (or 70b), changes in proportion to a pressure difference between the inlet and outlet ports of solenoid valve 70a (or 70b), changes of the signal voltage Va caused upon closing the valve 70a (or 70b) may be maintained within the non-sensitive area.

OPERATION

Figure 12:
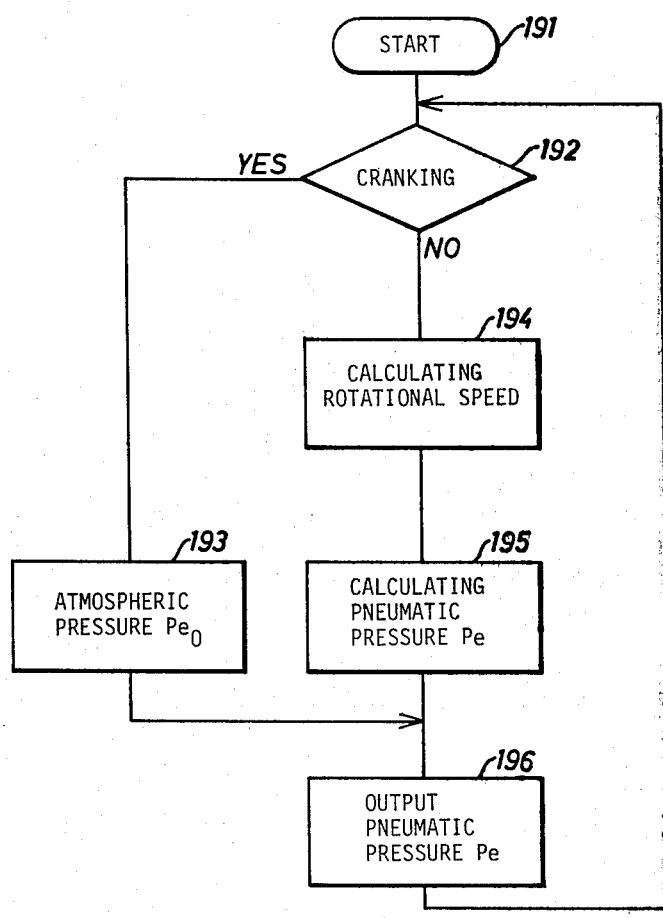
FIG. 12 is a flow chart illustrative of the operation of the digital computer.

With reference to a flow chart of FIG. 12, the mode of operation of the above embodiment will be described hereinafter. When the ignition switch SW is closed to provide a connection between contacts B and IG, the electronic control circuit 100 is activated to initiate execution of the computer program at a point 191 shown in the flow chart, the program proceeding to a point 192. If a set signal is produced from set signal generator 110, it is applied to CPU 161 of computer 160 in response to I/O and SEL-1 signals from DCU 163. Then, CPU 161 discriminates the fact that the engine E is cranking, the program proceeding to a point 193. At point 193, a predetermined pneumatic pressure value Pe$_0$ stored in memory 162 is read out by CPU 161 in response to the I/O and SEL-5 signals and is applied as an output data to the digital-to-analog conversion circuit 170 at a point 196. Then, the output data from CPU 161 is converted into an electric analog voltage proportional thereto and is applied to the drive circuit 180.

Assuming that a signal voltage Va from sensor 90$b$ is lower than each of divided voltages Vb, Vc from voltage dividers 183, 184 due to the engine cranking, the power transistor 187 closes the solenoid valve 70$a$ in response to a low level signal from comparator 181, whereas the power transistor 188 opens the solenoid valve 70$b$ in response to a high level signal from comparator 182. Thus, the atmospheric pressure is applied to the servo-chambers 34, 43 of flow controllers 30, 40 from the upstream of venturi 13 through passages 12$a$ and 31$a$ so that the control valve 33 is opened due to the biasing force of spring 36 and the control valve 46 is closed due to the biasing force of spring 45.

Under the above condition, the exhaust gas recirculation pipe 17 is isolated from the exhaust pipe 16 by the closed control valve 46, the valve 56 of pressure regulator 50 is opened by the biasing force of spring 55, and the control valve 66 of gas flow controller 60 is closed by the biasing force of spring 65. On the other hand, the air from air cleaner 11 flows into venturi portion 13 and into primary air passage 22 through air jet 22$a$ and secondary air passage 23. The air flowing through secondary air passage 23 is controlled by the control valve 33, while fuel from float chamber 24 is drawn into fuel passage 21 through fuel jet 21$a$. The air in passage 22 is mixed with the fuel in passage 21, and the air-fuel mixture is drawn into venturi portion 13 from nozzle 21$b$. The air fuel mixture is further mixed with the air in venturi portion 13 and enters into the combustion chamber of engine E through throttle valve 14 at a proper fuel-to-air ratio. The air fuel mixture is burned in the combustion chamber and discharged as exhaust gases through the exhaust pipe 16.

If the set signal from set signal generator 110 does not appear at the point 192 after the cranking operation, the start of engine E is discriminated by CPU 161 so that the program proceeds to a point 194. At point 194, a binary signal indicative of a period of time from speed signal generator 130 is entered into computer 160 in response to the I/O and SEL-2 signals and is converted by CPU 161 into a binary signal indicative of the engine speed N which is temporarily memorized in memory 162. In accordance with proceeding of the program to a point 195, an output request signal from CPU 161 is applied to the analog-to-digital conversion circuit 150 so that a binary signal indicative of an intake manifold vacuum Pv is entered into computer 160 in response to the I/O, SEL-3 and SEL-4 signals. Subsequently, the memorized binary signal is read out, and the values of the above-noted integers l and m are respectively determined by CPU 161 from the programmed inequalities (2) and (3) in relation to the engine speed N and the intake manifold vacuum Pv. Thereafter, CPU 161 reads out respective values f(l$\Delta$Pv, m$\Delta$N), f{(l+1)$\Delta$Pv, m$\Delta$N}, f{l$\Delta$Pv, (m+1)$\Delta$N} and f{(l+1)$\Delta$Pv, (m+1)$\Delta$N} from memory 162 in relation to the values of the integers l, m. Thus, the respective values, Pv, N, l, m, $\Delta$Pv, $\Delta$N are used by CPU 161 to calculate a value indicative of optimum pneumatic pressure Pe from the programmed equations (4), (5) and (6). At a point 196, the calculated value is applied as an output data to the digital-to-analog conversion circuit 170 in response to the I/O and SEL-5 signals. Thus, the calculated value is converted into an electric analog voltage and applied to the drive circuit 180.

Figure 9:
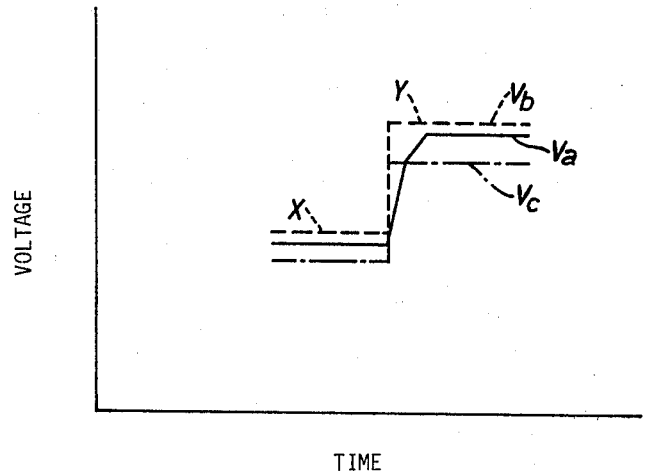

Assuming that the vehicle is being accelerated after started, a signal voltage Va from sensor 90$b$ is higher than each of divided voltages Vb, Vc defined by a non-sensitive area X shown in FIG. 9, the area X corresponding with normal travel of the vehicle. Then, the power transistor 187 opens the solenoid valve 70$a$ in response to a high level signal from comparator 181, whereas the power transistor 188 closes the solenoid valve 70$b$ in response to a low level signal from comparator 182. Thus, the servochambers 34, 43 of flow controllers 30, 40 are disconnected from the passage 12$a$ and supplied with the intake manifold vacuum through passages 15$a$, 31$a$. This modulates the pneumatic pressure in servo-chambers 34, 43 in a negative value to open the control valve 46 of gas flow controller 40 and to decrease the opening degree of control valve 33.

Under this condition, exhaust pressure is applied into the recirculation pipe 17 through the control valve 46 and subsequently applied to the exhaust chamber 53 of pressure regulator 50. When the pressure in exhaust chamber 53 reaches a predetermined value, the valve 56 is closed against the biasing force of spring 55 so that only the intake manifold vacuum is applied to the variable pressure chamber 63 of gas flow controller 60 through passages 15$a$, 51$a$ and 61$a$ under throttling effect of the orifice F$_1$. Then, the control valve 66 of gas flow controller 60 is opened against the biasing force of spring 65, and the opening degree of valve 66 is regulated in response to opening and closing of the valve 56 of pressure regulator 50. As a result, the quantity of exhaust gases supplied into recirculation pipe 17 is controlled in accordance with the opening degree of valve 46, and the quantity of exhaust gases recirculated into the intake manifold 15 is controlled in accordance with the opening degree of valve 66.

On the other hand, the air from air cleaner 11 flows into venturi portion 13 and into primary and secondary air passages 22 and 23, while fuel from float chamber 24 is drawn into fuel passage 21 through fuel jet 21$a$. The bleed air from passage 22 and the air from passage 23 are mixed with the fuel in passage 21, and the air-fuel mixture is drawn into venturi portion 13 from nozzle 21$b$. In this instance, air-to-fuel ratio of the mixture is controlled in accordance with the opening degree of control valve 33. Subsequently, the air-fuel mixture is further mixed with the air in venturi portion 13 and enters into the combustion chamber of engine E through throttle valve 14. Thus, air-to-fuel ratio of the mixture is controlled in response to the quantity of exhaust gases recirculated into the intake manifold 15 to ensure optimum operation of the engine.

When the vehicle is conditioned in its normal travel due to the above-noted acceleration, the signal voltage Va from sensor 90$b$ reaches a divided voltage Vb defined by the non-sensitive area X. Then, the power transistor 187 closes the solenoid valve 70$a$ in response to a low level signal from comparator 181 under closure of the solenoid valve 70b. Although delay of closing operation of solenoid valve 70a causes undershoot of the signal voltage Va into the non-sensitive area X at this stage, the area X provides a potential difference defined by divided voltages Va and Vb in relation to an analog voltage which will be produced from the converter 174 at the normal travel of the vehicle. Thus, the signal voltage Va is maintained in the area X, as shown in FIG. 9, to hold each closure of the solenoid valves 70a, 70b. As a result, it will be understood that an error of each pneumatic pressure appearing in the controllers 30, 40 upon closure of the valve 70a is determined by the potential difference of the non-sensitive area X. In other words, this means that an error of each flow quantity of the air and exhaust gases respectively through the control valves 33, 46 is determined by the potential difference of the area X.

When the vehicle is decelerated under this condition, the above-noted signal voltage Va becomes lower than each of divided voltages Vb and Vc which are defined by a non-sensitive area Y corresponding with decelerated condition of the vehicle (see FIG. 9). Then, the power transistor 188 opens the solenoid valve 70b in response to a high level signal from comparator 182 under closure of the solenoid valve 70a. Thus, the atmospheric pressure is applied to the servo-chambers 34, 43 of flow controllers 30, 40 from the upstream of venturi portion 13 through passages 12a and 31a. This modulates the pneumatic pressure in servo-chambers 34, 43 toward the atmospheric pressure to increase the opening degree of control valve 33 and to decrease the opening degree of control valve 46.

Under this condition, the quantity of exhaust gases supplied into the recirculation pipe 17 is controlled in accordance with the decreased opening degree of valve 46 and then controlled in accordance with the opening degree of control valve 66 to be recirculated into the intake manifold 15, as previously described. On the other hand, the air flowing from air cleaner 11 into the air passage 23 is controlled in accordance with the increased opening degree of valve 33 and then applied into the air passage 22, as previously described. Thus, air-to-fuel ratio of the mixture is controlled in response to the quantity of exhaust gases recirculated into the intake manifold 15 to ensure optimum operation of the engine.

When the above-noted deceleration of the vehicle is conducted, the signal voltage Va from sensor 90b reaches a divided voltage Vc defined by the non-sensitive area Y. Then, the power transistor 188 closes the solenoid valve 70b in response to a low level signal from comparator 182 under closure of the solenoid valve 70a. Although delay of closing operation of solenoid valve 70b causes overshoot of the signal voltage Va into the non-sensitive area Y at this stage, the area Y provides a potential difference defined by divided voltages Va and Vb in relation to an analog voltage which will be produced from the converter 174 at the decelerated condition of the vehicle. Thus, the signal voltage Va is maintained in the area Y, as shown in FIG. 9, to hold each closure of the solenoid valves 70a, 70b. As a result, it will be understood that an error of each pneumatic pressure appearing in the controllers 30, 40 upon closure of the valve 70b is determined by the potential difference of the non-sensitive area Y. In other words, this means that an error of each flow quantity of the air and exhaust gases respectively through the control valves 33, 46 is determined by the potential difference of the area Y.

Although in the above embodiment the predetermined resistance ratio Ra/Rb in the voltage divider 184 is determined larger than the predetermined resistance ratio ra/rb in the voltage divider 183, it may be determined smaller than the predetermined ratio ra/rb.

Figure 13:
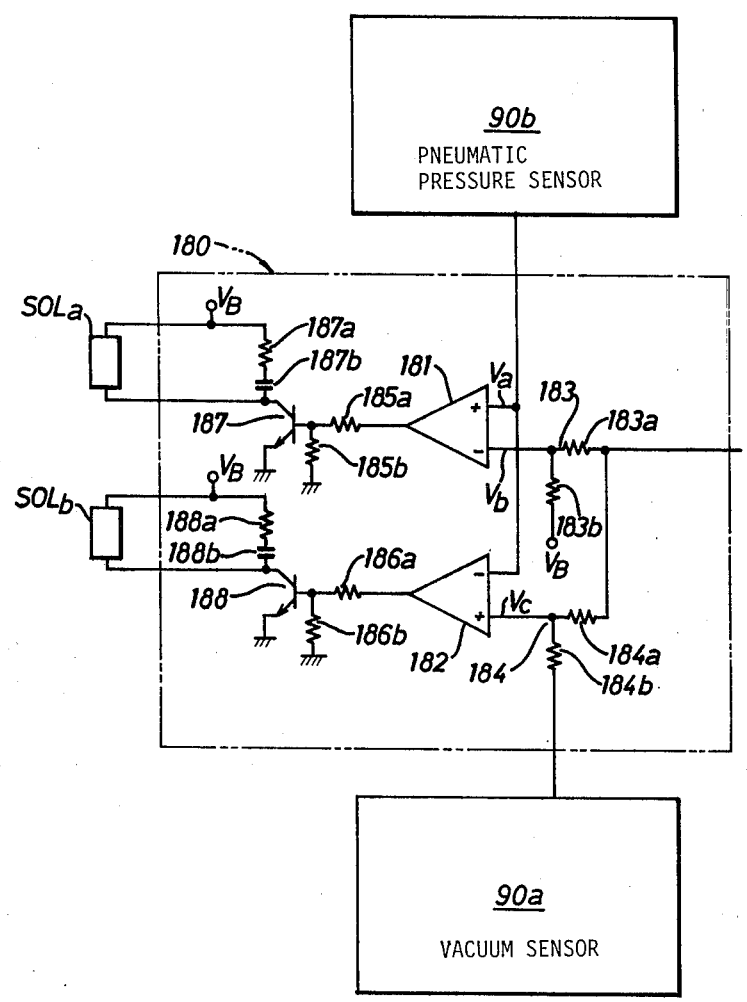
FIG. 13 illustrates a modification of the drive circuit shown in block form in FIG. 3.

While the resistor 184b of voltage divider 184 is grounded in the above embodiment, it may be connected to the vacuum sensor 90a such that the potential difference between the divided voltages Vb and Vc in FIG. 8 is further made narrower (see FIG. 13).

Figure 14:
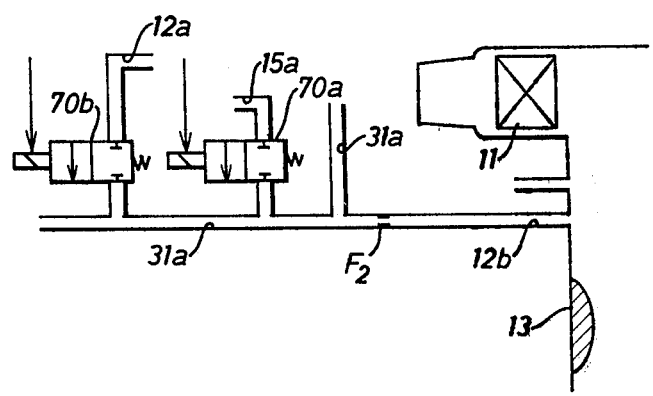
FIG. 14 illustrates a partial modification of the electronic control system shown in FIG. 2.
Figure 15:
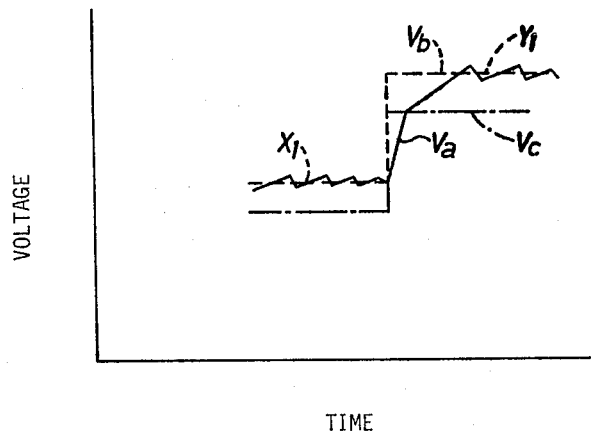
FIG. 15 is a graph showing operative characteristic of the drive circuit in relation to the modification of FIG. 14.

FIG. 14 illustrates a partial modification of the above embodiment in which a portion of the passage 31a between the solenoid valves 70a, 70b and the flow controller 30 is connected to the upstream of venturi portion 13 through a passage 12b, and an orifice $F_2$ is disposed within the passage 12b. Assuming that the vehicle is maintained in its normal travel corresponding with a non-sensitive area X, as shown in FIG. 15, a signal voltage Va from sensor 90b is repetitively maintained lower and higher than a divided voltage Vb which will be produced from the voltage divider 183 at the non-sensitive area X. In other words, the atmospheric pressure flowing into the passage 12b from the air cleaner 11 is throttled by the orifice $F_2$ under closure of the solenoid valve 70b and applied to the flow controllers 30, 40 through the passage 31a. Meanwhile, the solenoid valve 70a is repetitively opened and closed in response to low and high level signals from power transistor 187 so that the intake manifold vacuum is intermittently applied to the flow controllers 30, 40 through the passages 15a, 31a. Thus, each pneumatic pressure appearing in the flow controllers 30, 40 is substantially maintained in a value corresponding with a divided voltage Vb of the area $X_1$ due to relative operation of the throttled atmospheric pressure from the orifice $F_2$ and the intermittent intake manifold vacuum from the solenoid valve 70a. This means that each flow quantity of the air and exhaust gases respectively through the air passage 23 and recirculation pipe 17 is precisely controlled by each of the control valves 33, 46 in a calculated optimum value in the computer 160.

When the vehicle is decelerated under this condition, the above-noted signal voltage Va becomes lower than each of divided voltages Vb and Vc which are defined by a non-sensitive area $Y_1$ corresponding with decelerated condition of the vehicle (see FIG. 15). Then, the solenoid valve 70b is opened in response to a low level signal from power transistor 188 under closure of the solenoid valve 70a so that the atmospheric pressure is applied to the flow controllers 30, 40 from the upstream of venturi portion 13 through passages 12a, 31a. Thus, the opening degrees of control valves 33 and 46 are respectively increased and decreased to control the quantity of exhaust gas recirculation and air-to-fuel ratio of the mixture, as previously described.

When the above-noted deceleration of the vehicle is conducted, the signal voltage Va from sensor 90b reaches the divided voltage Vc defined by the non-sensitive area $Y_1$. Then, the power transistor 188 closes the solenoid valve 70b in response to a low level signal from the comparator 182 under closure of the solenoid valve 70a. Thereafter, only the atmospheric pressure flowing into the passage 12b from the air cleaner 11 is applied to the flow controllers 30, 40 through the passage 31a under control of the orifice $F_2$. When each pneumatic pressure appearing in the flow controllers 30, 40 changes toward the atmospheric pressure beyond a value corresponding with the divided voltage Vb defined by the area Y$_1$, the solenoid valve 70a is opened in response to a low level signal from power transistor 187 to apply the intake manifold vacuum into the flow controllers 30, 40 through the passages 15a, 31a. When each pneumatic pressure in the flow controllers 30, 40 again enters into a pressure range corresponding with the area Y$_1$, the solenoid valve 70a is closed in response to a high level signal from power transistor 187 so that only the atmospheric pressure through the orifice F$_2$ is applied to the flow controllers 30, 40, as previously described. This modulates each pneumatic pressure in the flow controllers 30, 40 toward the atmospheric pressure. Thereafter, the above-noted repetitive relative operation of the solenoid valve 70a and orifice F$_2$ is conducted to substantially maintain each pneumatic pressure in the flow controllers 30, 40 in a optimum value calculated by computer 160. In addition, increase of throttle effect of the orifice F$_2$ reduces frequency of closing and opening the solenoid valve to ensure long life of the solenoid valve.

Figure 16:
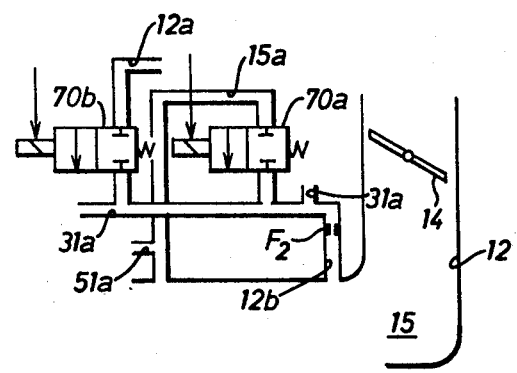
FIG. 16 illustrates another partial modification of the electronic control system shown in FIG. 2.
Figure 17:
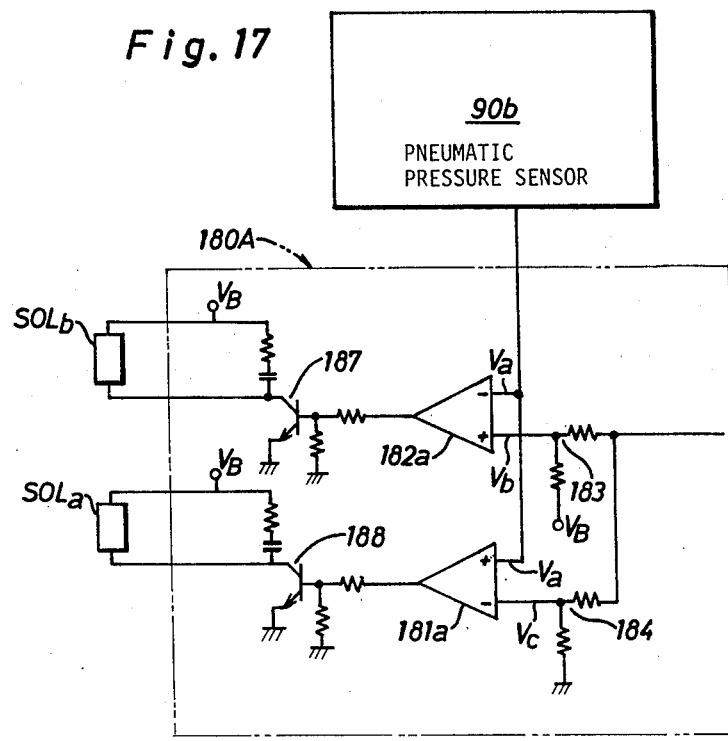
FIG. 17 illustrates another modification of the drive circuit shown in block form in FIG. 3.

For practice of the present invention, the passage 12b shown in FIG. 14 may be connected to the intake manifold 15 in replacement of the upstream of venturi portion 13, as shown in FIG. 16. In this case, the drive circuit 180 should be replaced with another drive circuit 180A in which the comparators 181 and 182 are respectively replaced with comparators 182a and 181a, and the solenoids SOL$_b$ and SOL$_a$ of valves 70b and 70a are respectively connected to the power transistors 187 and 188, as shown in FIG. 17.

Although in the embodiment the air passage 23 is connected between the air passage 22 and the upstream of venturi portion 13, it may be replaced with an appropriate air passage extending into the air passage 22 from the exterior through an air filter.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electronic control system for an internal combustion engine having an exhaust gas recirculation system including a recirculation conduit to provide a communication between an intake manifold and an exhaust pipe of the engine, the control system comprising:

a servomotor to be operated by pneumatic pressure applied thereto;

flow control means associated with said servomotor for controlling the quantity of exhaust gases flowing through said recirculation conduit from said exhaust pipe to said intake manifold in accordance with changes of the pneumatic pressure applied to said servomotor;

first detecting means for producing a first electric binary signal indicative of rotational speed of the engine;

second detecting means for producing a second electric binary signal indicative of intake manifold vacuum of the engine;

third detecting means for detecting pneumatic pressure applied to said servomotor to produce a first electric analog signal indicative of the pneumatic pressure;

a digital computer for calculating a value indicative of optimum pneumatic pressure to be applied to said servomotor in accordance with said first and second binary signals, said computer being programmed to calculate the optimum value from a function describing a desired relationship among optimum pneumatic pressure, rotational speed and intake manifold vacuum of said engine;

means for producing second and third electric analog signals having different levels respectively proportional to the calculated optimum value from said computer, the difference between the respective levels of said second and third analog signals being defined in accordance with changes of the calculated optimum value;

a drive circuit for comparing a level of said first analog signal with each level of said second and third analog signals to produce a first output signal therefrom when the level of said second analog signal is higher than the level of said first analog signal and to produce a second output signal therefrom when the level of said third analog signal is lower than the level of said first analog signal, said drive circuit ceasing the output signals when the level of said first analog signal is in a range between the levels of said second and third analog signals; and first and second electrically operated valves to selectively apply intake manifold vacuum and the atmospheric pressure to said servomotor when energized in response to one of said first and second output signals from said drive circuit.

2. An electronic control system as claimed in claim 1, wherein an orifice is provided within a passage connecting said servomotor to the upstream of said venturi portion in said air induction passage.

3. An electronic control system as claimed in claim 1, wherein said means for producing second and third analog signals comprises first and second voltage dividers for producing first and second divided voltage respectively proportional to the calculated optimum value from said computer, the difference between said first and second divided voltages being defined in accordance with changes of the calculated optimum value; and wherein said drive circuit is arranged to compare a level of said first analog signal with said first and second divided voltages to produce a first output signal therefrom when said first divided voltage is higher than the level of said first analog signal and to produce a second output signal therefrom when said second divided voltage is lower than the level of said first analog signal, said drive circuit ceasing the output signals when the level of said first analog signal is between said first and second divided voltages.

4. An electronic control system as claimed in claim 3, wherein said first voltage divider includes a pair of resistors connected in series with each other to define said first divided voltage at a first predetermined resistance ratio; and said second voltage divider includes another pair of resistors connected in series with each other to define said second divided voltage at a second predetermined resistance ratio, the second predetermined resistance ratio being different from the first predetermined resistance ratio to provide the difference between said first and second divided voltages.

5. An electronic control system for an internal combustion engine having a carburetor and an exhaust gas recirculation system, said carburetor including an air induction passage with a venturi portion, a fuel passage supplying fuel from a float chamber into said venturi portion and an air passage permitting the flow of air into said fuel passage to be mixed with fuel, and said exhaust gas recirculation system including a recirculation conduit to provide a communication between an intake manifold and an exhaust pipe of said engine, said control system comprising:

first and second servomotors to be operated by pneumatic pressure applied thereto;

first flow control means associated with said first servomotor for increasing the quantity of exhaust gases flowing through said conduit from said exhaust pipe to said intake manifold in accordance with decrease of the pneumatic pressure and for decreasing the quantity of exhaust gases in accordance with increase of the pneumatic pressure;

second flow control means associated with said second servomotor for increasing the quantity of air flowing through said air passage in accordance with increase of the pnuematic pressure and for decreasing the quantity of air in accordance with decrease of the pneumatic pressure;

first detecting means for producing a first electric binary signal indicative of rotational speed of said engine;

second detecting means for producing a second electric binary signal indicative of intake manifold vacuum of said engine;

third detecting means for detecting pneumatic pressure applied to said first and second servomotors to produce a first electric analog signal indicative of the pneumatic pressure;

a digital computer for calculating a value indicative of optimum pneumatic pressure to be applied to said first and second servomotors in accordance with said first and second binary signals, said computer being programmed to calculate the optimum value from a function describing a desired relationship among optimum pneumatic pressure, rotational speed and intake manifold vacuum of said engine;

means for producing second and third electric analog signals having different levels respectively proportional to the calculated optimum value from said computer, the difference between the respective levels of said second and third analog signals being defined in accordance with changes of the calculated optimum value;

a drive circuit for comparing a level of said first analog signal with each level of said second and third analog signals to produce a first output signal therefrom when the level of said second analog signal is higher than the level of said first analog signal and to produce a second output signal therefrom when the level of said third analog signal is lower than the level of said first analog signal, said drive circuit ceasing the output signals when the level of said first analog signal is in a range between the levels of said second and third analog signals; and first and second electrically operated valves to selectively apply intake manifold vacuum and the atmospheric pressure to said first and second servomotors when energized in response to one of said first and second output signals from said drive circuit.

6. An electronic control system as claimed in claim 5, wherein an orifice is provided within a passage connecting said first and second servomotors to the upstream of said venturi portion in said air induction passage.

7. An electronic control system as claimed in claim 5, wherein said means for producing second and third analog signals comprises first and second voltage dividers for producing first and second divided voltages respectively proportional to the calculated optimum value from said computer, the difference between said first and second divided voltages being defined in accordance with changes of the calculated optimum value; and wherein said drive circuit is arranged to compare a level of said first analog signal with said first and second divided voltages to produce a first output signal therefrom when said first divided voltage is higher than the level of said first analog signal and to produce a second output signal therefrom when said second divided voltage is lower than the level of said first analog signal, said drive circuit ceasing the output signals when the level of said first analog signal is between said first and second divided voltages.

8. An electronic control system for an internal combustion engine having a carburetor and an exhaust gas recirculation system, said carburetor including an air induction passage with a venturi portion, a fuel passage supplying fuel from a float chamber into said venturi portion and an air passage permitting the flow of air into said fuel passage to be mixed with fuel, and said exhaust gas recirculation system including a recirculation conduit to provide a communication between an intake manifold and an exhaust pipe of said engine, said control system comprising:

first and second servomotors to be operated by pneumatic pressure applied thereto;

first flow control means associated with said first servomotor for increasing the quantity of exhaust gases flowing through said conduit from said exhaust pipe to said intake manifold in accordance with decrease of the pneumatic pressure and for decreasing the quantity of exhaust gases in accordance with increase of the pneumatic pressure;

second flow control means associated with said second servomotor for increasing the quantity of air flowing through said air passage in accordance with increase of the pneumatic pressure and for decreasing the quantity of air in accordance with decrease of the pneumatic pressure;

first detecting means for producing a first electric binary signal indicative of rotational speed of said engine;

second detecting means for producing a second electric binary signal indicative of intake manifold vacuum of said engine;

third detecting means for detecting pneumatic pressure applied to said first and second servomotors to produce a first electric analog signal indicative of the pneumatic pressure;

a digital computer for calculating a value indicative of optimum pneumatic pressure to be applied to said first and second servomotors in accordance with said first and second binary signals, said computer being programmed to calculate the optimum value from a function describing a desired relationship among optimum pneumatic pressure, rotational speed and intake manifold vacuum of said engine;

means for producing second and third electric analog signals having high and low levels respectively proportional to the calculated optimum value from said computer, the difference between the high and low levels of said second and third analog signals being defined to increase in accordance with increase of the calculated optimum value;

a drive circuit for comparing a level of said first analog signal with the high and low levels of said second and third analog signals to produce a first output signal therefrom when the high level of said second analog signal is higher than the level of said first analog signal and to produce a second output signal therefrom when the low level of said third analog signal is lower than the level of said first analog signal, said drive circuit ceasing the output signals when the level of said first analog signal is in a range between the high and low levels of said second and third analog signals; and first and second electrically operated valves to selectively apply intake manifold vacuum and the atmospheric pressure to said first and second servomotors when energized in response to one of said first and second output signals from said drive circuit.

9. An electronic circuit system as claimed in claim 8, wherein an orifice is provided within a passage connecting said servomotors to the upstream of said venturi portion in said air induction passage.

10. An electronic control system as claimed in claim 8, wherein said means for producing second and third analog signals comprises first and second voltage dividers for producing first and second divided voltages respectively proportional to the calculated optimum value from said computer, the difference between said first and second divided voltages being defined in accordance with changes of the calculated optimum value; and wherein said drive circuit is arranged to compare a level of said first analog signal with said first and second divided voltages to produce a first output signal therefrom when said first divided voltage is higher than the level of said first analog signal and to produce a second output signal therefrom when said second divided voltage is lower than the level of said first analog signal, said drive circuit ceasing the output signals when the level of said first analog signal is between said first and second divided voltages.

* * * * *